United States Patent [19]

Lemieux

[11] Patent Number: 5,615,255
[45] Date of Patent: Mar. 25, 1997

[54] METHOD AND APPARATUS FOR MEASURING LOADS IN A COMMON CHANNEL SIGNALLING LINK

[75] Inventor: Yves Lemieux, Kirkland, Canada

[73] Assignee: Telefonaktiebolaget L M Ericsson, Stockholm, Sweden

[21] Appl. No.: 705,013

[22] Filed: Aug. 29, 1996

Related U.S. Application Data

[63] Continuation of Ser. No. 365,919, Dec. 29, 1994, abandoned.

[51] Int. Cl.$^6$ .................................. H04J 3/14; H04M 3/22
[52] U.S. Cl. ............................ 379/230; 379/233; 379/133
[58] Field of Search ..................................... 379/230, 233, 379/112, 113, 137, 138, 133, 134, 135, 136

[56] References Cited

U.S. PATENT DOCUMENTS

| | | | |
|---|---|---|---|
| 3,573,740 | 4/1971 | Berger | 340/172.5 |
| 4,484,326 | 11/1984 | Turner | 370/60 |
| 4,613,729 | 9/1986 | Daisenberger | 179/8 A |
| 4,626,624 | 12/1986 | Daisenberger | 379/137 |
| 4,626,625 | 12/1986 | Daisenberger | 379/137 |
| 4,629,830 | 12/1986 | Daisenberger | 340/825.03 |
| 4,701,943 | 10/1987 | Davis et al. | 379/57 |
| 4,748,658 | 5/1988 | Gopal | 379/221 |

FOREIGN PATENT DOCUMENTS

| | | |
|---|---|---|
| 0108554A1 | 10/1983 | European Pat. Off. . |
| 0621734A2 | 4/1994 | European Pat. Off. . |

OTHER PUBLICATIONS

Joachim Zepf, Gerhard Rufa, *Congestion and Flow Control in Signaling System No. 7—Impacts of Intelligent Networks and New Services*, Apr. 12, 1994, pp. 501–509.

Roch H. Glitho, *Signalling system number 7 network services part and X.25: A comparative study*, Sep. 26, 1994, pp. 495–502.

Grinsec, Elsevier Science Publishers, *Electronic Switching; Basic Telephone Call Processing: Traffic supervision and load control*, Part IV, Chapter 1, Item 8, pp. 411–415.

IEEE Journal On Selected Areas in Communications, vol. 12, No. 3, Apr. 1994, (New York), J. Zepf, et al., "Congestion and Flow Control in Signaling System No. 7—Impacts of Intelligent Networks and New Services", pp. 501–509, especially paragraph 1 and paragraph 2A.

Computer Networks and ISDN Systems, vol. 26, No. 12, Sep. 1994, (Amsterdam), Roch H. Glitho, "Signaling System Number 7 Network Services Part and X.25: A Comparative Study", p. 1495—p. 1502, Fig. 2.

Grinsec "Electronic Switching", 1983, Elsevier Science Publishers, Amsterdam(NL), p. 411, line 14–p. 415, line 30.

*Primary Examiner*—Krista M. Zele
*Assistant Examiner*—Thomas F. Presson
*Attorney, Agent, or Firm*—Jenkens & Gilchrist, P.C.

[57] ABSTRACT

A method and apparatus for monitoring the load on a communications link in a common channel signalling system connecting an exchange in a telephone network to regional equipment such as a remote subscriber switch or a remote cellular base station. The length indicator field of each signal unit transmitted over the reserved channel of the communications link is monitored by the exchange to determine the number of bytes of message data being transmitted over the link during a predetermined time period. The load on the communications link is identified by taking the ratio of the determined number of bytes to the number of full value bytes capable of transmission over the communications link during an identical time period. The determined load ratio is compared to a predetermined threshold level to identify an overload condition in response to which the exchange relieves the overload by spreading the messages to other links, discarding low priority ones of the messages, or controlling message flow over the link as necessary.

34 Claims, 3 Drawing Sheets

METHOD AND APPARATUS FOR MEASURING LOADS IN A COMMON CHANNEL SIGNALLING LINK

This application is a continuation of application Ser. No. 08/365,919, filed on Dec. 29, 1994, which was abandoned upon the filing hereof.

BACKGROUND OF THE INVENTION

1. Technical Field of the Invention

The present invention relates to telephone networks and, in particular, to the common channel signalling links provided therein, and to the measurement of the message loads present on such signalling links.

2. Description of Related Art

Telephone networks utilize common channel signalling to facilitate message communications between the central processor in a parent exchange and the processors in any included regional equipment external to the exchange. Common channel signalling occurs over at least one of the communications links that also carry subscriber voice communications. At least one channel on at least one of the communications links is reserved for providing a two-way signalling path between the central processor and each of the regional equipment processors. A signalling terminal located at each end of the communications link functions to format processor signalling messages for transmission over the reserved channel, and further provides any other transfer control, maintenance or restart functions necessary for interfacing the link with the exchange and the regional equipment.

The processor signalling messages transmitted over the reserved channel of the communications link are formatted in accordance with the CCITT Common Channel Signalling System No. 7 level 2 protocol. These message transmissions comprise digital signals transmitted at a rate of 64 kbps. Analog message signals may also be transmitted in a common channel signalling system using the format defined by the CCITT Common Channel Signalling System No. 6 protocol at a rate of 2.4 kbps.

As the functional capabilities of telephone exchanges have improved to provide more and more services to subscribers, including the addition of so-called value added services, the demands placed on the reserved channel of the communications link in a common channel signalling system and the competition for access to and use of the communications link have increased dramatically. This is especially a concern in mobile telephone networks where the transmission capabilities of the communications links between the mobile service switching center of the exchange and the remote base stations which communicate with the cellular telephones dictate the number of signalling/transmission messages that may be handled by the network. Loading of the communications link, and in particular the common channel signalling system, adversely affects the nature and quality of the services provided to the subscribers. Accordingly, it has become increasingly important to monitor and identify in a graceful and progressive manner, and in real time, the load of useful traffic being serviced by the reserved channel on the communications link in a common channel signalling system.

SUMMARY OF THE INVENTION

Messages transmitted over the communications link using the CCITT CCS # 7 protocol are conveyed by means of a signal unit. Signal units are of varying length (up to a predetermined limit), with the length used determined by the amount of signalling information included in the message. There are several types of signal units authorized by the CCITT CCS # 7 protocol including the following three types: a Message Signal Unit (MSU); a Link Status Signal Unit (LSSU); and a Fill-In Signal Unit (FISU).

Each signal unit includes the same transfer control fields for providing signal unit delimitation, sequencing, error control, and type discrimination. The signal units further each include a length indicator field which identifies the number of 8-bit message carrying bytes that are included in the signal unit between the length indicator field and a subsequent check bit field. The length indicator field accounts for the presence of, and therefore does not include in the field value the number of fill-in bytes, if any, present in the signal unit.

In accordance with the method and apparatus of the present invention, the communications link is monitored by the exchange on a continuous basis, with each such monitoring instance occurring for a predetermined time period. In particular, the length indicator field of each signal unit carried over the communications link is monitored by the exchange during the predetermined time period to identify in real time the number of bits of "useful" (i.e., message) traffic passing over the communications link. This information is advantageously provided to the exchange by reading the length indicator field of each signal unit transmitted over the link.

Rather than use the value of the length indicator field to identify the type of signal unit (as has historically been the case), in the present invention the values (in numbers of bits) of useful signal unit traffic identified from reading the length indicator fields of each signal unit are summed over the time period and compared to a total value (in numbers of bytes) for the maximum data load capable of being carried by the control signalling link during an identical time period. From this information, the load on the communications link is determined and further processed by the exchange to optimize exchange signalling by different means, such as by spreading the communications traffic (and in particular the message traffic) over each of the included communications links, discarding certain messages, or limiting message flow.

BRIEF DESCRIPTION OF THE DRAWINGS

A more complete understanding of the method and apparatus of the present invention may be had by reference to the following Detailed Description when taken in conjunction with the accompanying Drawings wherein.

DETAILED DESCRIPTION OF EMBODIMENTS

The functional operation and configuration of exchanges and regional equipment in telephone networks are well known to those skilled in the art. To facilitate an understanding of the present invention, a brief description of the elements of and interconnections within an exchange and some exemplary pieces of regional equipment (comprising a remote subscriber switch and a remote base station) will be provided herein.

Figure 1:
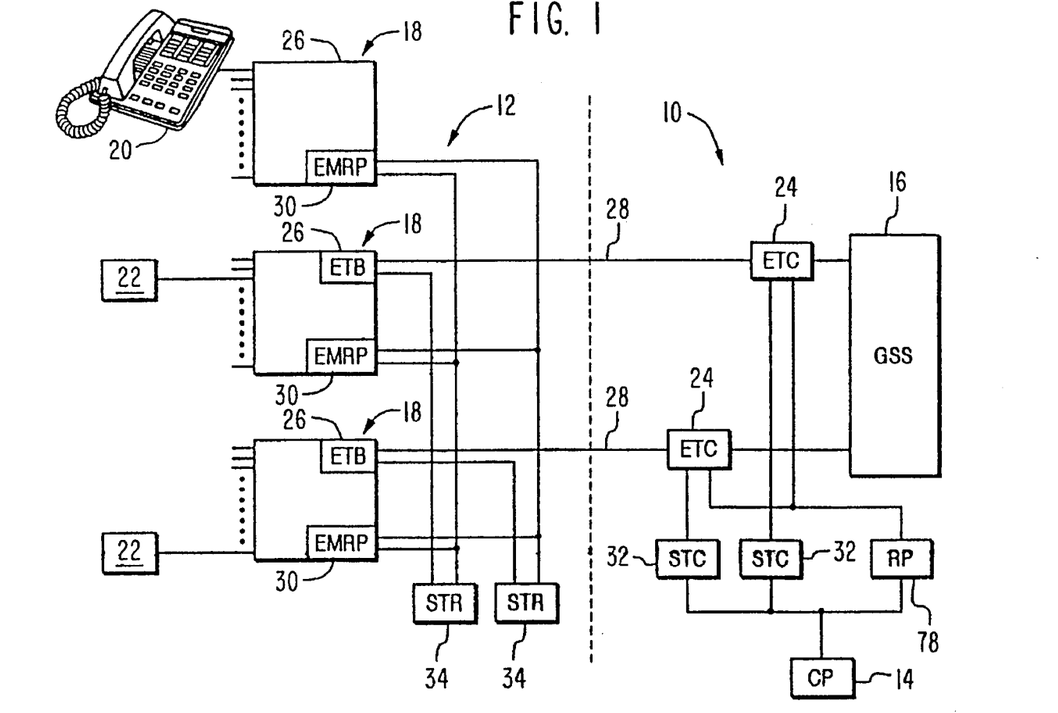
FIG. 1 is a block diagram of a portion of a telephone network utilizing a common channel signalling system.

Referring now to FIG. 1, there is shown a block diagram of a portion of a telephone network including a parent exchange 10 and a piece of regional equipment comprising a remote subscriber switch 12. It will, of course, be understood that the present invention is useful with many different regional equipment types, and the disclosure of the connection of a remote subscriber switch 12 to the exchange 10 in FIG. 1 is by way of illustration of the application of the invention rather than of limitation.

The parent exchange 10 includes a central processor 14 and a group switching subsystem 16. The parent exchange 10 further includes a plurality of exchange terminal circuits 24 connected to the group switching subsystem 16. The remote subscriber switch 12 includes a plurality of line switch modules 18, each of which may be connected to a plurality of subscriber telephones 20, and/or to a plurality of any other type of compatible subscriber communication devices 22. Each line switch module 18 in the remote subscriber switch 12 includes an exchange terminal board 26.

A communications link 28 is provided to connect each exchange terminal board 26 to a corresponding exchange terminal circuit 24 in the parent exchange 10. It will, of course, be understood that each communications link 28 is time division multiplexed to provide a plurality of channels for carrying subscriber voice communications between the parent exchange 10 and the remote subscriber switch 12. In E-1 (European) practice, thirty-two channels are provided. In T-1 (North American) practice, twenty-four channels are provided.

In order for the telephone network to operate properly, the parent exchange 10 and the remote subscriber switch 12 must be able to communicate with each other. In particular, it is vitally important that the central processor 14 of the exchange 10 be able to communicate with an extension module regional processor 30 present in each line switch module 18. Because it would be too costly to provide a separate physical communications link between the central processor 14 and each extension module regional processor 30, one of the plurality of subscriber channels provided on the communications link 28 is assigned to carry processor signalling messages.

In E-1 practice, channel sixteen and, in T-1 practice, channel nine on the communications link 28 are reserved for carrying processor signalling messages. It will be understood, however, that any one or more than one of the plurality of channels may be reserved for this task. The use of one or more of the subscriber channels reserved for carrying processor signalling message communications is referred to in the art as "common channel signalling." In order to provide for improved system reliability, at least two separate communications links 28 between the exchange 10 and the remote subscriber switch 12 have a channel reserved thereon for carrying processor signalling message communications.

A signalling terminal (central) 32 is provided in the exchange 10 to connect the central processor 14 to each of the exchange terminal circuits 24. One signalling terminal (central) 32 is provided for each communications link 28 extending between the exchange 10 and the remote subscriber switch 12 that is to be used by the network for common channel carrying of processor signalling message communications. The signalling terminal (central) 32 processes and formats processor signalling messages output from the central processor 14 into the proper format for transmission over the communications link 28. The exchange terminal circuit 24 then inserts the formatted messages through time division multiplexing into the reserved channel of the communications link 28 for transmission thereover to the remote subscriber switch 12.

In the remote subscriber switch 12, a signalling terminal (remote) 34 is provided to connect each extension module regional processor 30 to the exchange terminal boards 26. The exchange terminal board 26 extracts the formatted processor signalling messages from the reserved channel of the communications link 28, and the connected signalling terminal (remote) 34 processes and reformats the processor signalling messages for output to the extension module regional processor 30.

It will, of course, be understood that processor signalling messages may also be transmitted in the opposite direction from the extension module regional processor 30 to the central processor 14. These messages may comprise both original messages generated by the extension module regional processor 30 and responses to messages transmitted by the central processor 14. In either case, the signalling terminal (remote) 34 and the signalling terminal (central) 32, and the exchange terminal board 26 and exchange terminal circuit 24, perform the functions opposite from that described above with respect to the formatting and reformatting the processor signalling messages for transmission over, and the inserting and extracting of the processor signalling messages into and from the communications link 28.

Figure 3:
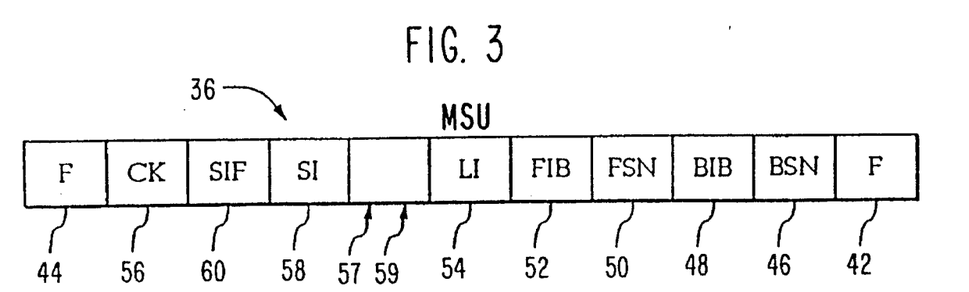
FIGS. 3–5 illustrate the messaging formats for the three types of signal units as specified by the CCITT Common Channel Signalling System No. 7 level 2 protocol.
Figure 4:
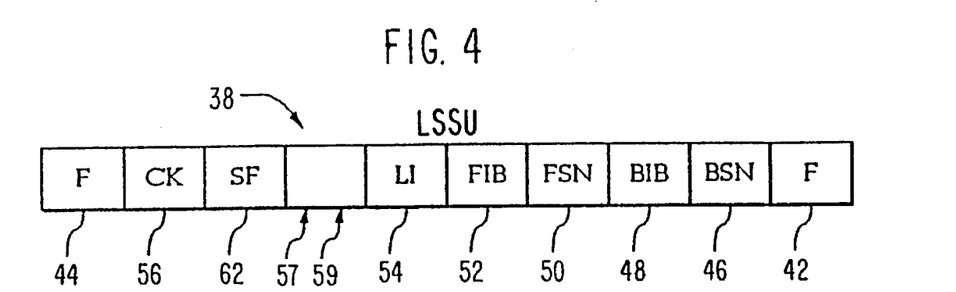
Figure 5:
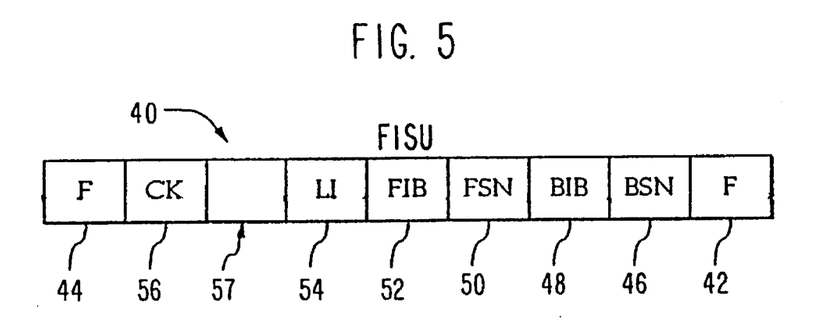

The format of the processor signalling messages transmitted over the communications link 28 is based on the CCITT Common Channel Signalling System No. 7 level 2 protocol. With reference now to FIGS. 3–5, there are several types of signal units authorized by the CCITT CCS # 7 protocol for use on the communications link 28 including the following three types: a Message Signal Unit (MSU) 36; a Link Status Signal Unit (LSSU) 38; and a Fill-In Signal Unit (FISU) 40. The MSU 36 is used to communicate signal messages between the components of the exchange and the remote subscriber switch 12. The LSSU 38 is used to communicate status information concerning the communications link 28. This information may relate to, for example, the initialization of the link 28. The FISU 40 is used to fill-in space on the reserved channel of the communications link 28 when no MSUs 36 or LSSUs 38 are being transmitted.

The MSU 36, LSSU 38 and FISU 40 are each delimited by an opening and closing Flag (F) 42 and 44, respectively. The opening flag 42 is sequentially followed by a Backward Sequence Number (BSN) field 46, a Backward Indicator Bit (BIB) 48, a Forward Sequence Number (FSN) field 50, and a Forward Indicator Bit (FIB) 52. In an MSU 36, the FSN field 50 records the sequence number assigned to the signal unit. In an LSSU 38 and FISU 40, the FSN field 50 contains the sequence number of the most recently sent MSU 36. The BSN field 46 is used to acknowledge the receipt of the signal unit. The BIB 48 and FIB 52 are used in conjunction with the associated BSN field 46 and FSN field 50, respectively, to provide for error correction capability. These bits are also used to initiate retransmission of a signal unit.

Each of the signal units 36, 38 and 40 further includes a Length Indicator (LI) field 54 which contains a value indicating the number of useful or message 8-bit bytes included in the signal unit between the LI field and an included Check Bit (CK) field 56. The total number of bytes transmitted between the LI field 54 and CK field 56 comprise not only the bytes associated with the processor signalling message, if any, being transmitted, but also other information bytes and/or fill-in bytes as will be described herein. The CK field 56 includes data used for detecting transmission errors affecting the content of the signal unit.

When a signal unit is received at the signalling terminals 32 and 34, a hardware interrupt of processor (12 or 30) operation is triggered resulting in a diminishment of processor load. To reduce the frequency of unnecessary interrupts caused by the receipt of LSSUs 38 and FISUs 40, and thus improve processor load, extra bytes referred to as "fill-in" bytes 57 are inserted into the LSSUs and FISUs between the LI field 54 and CK field 56. The number of fill-in bytes 57, if any, used varies with the linkspeed of the network. The LI field 54 accounts for the presence of, and therefore does not include in the field value, the number of any fill-in bytes 57 present in the signal unit.

The LI field 54 has conventionally only been used to identify the type of signal unit being transmitted. For example, only an MSU 36 (FIG. 3) will have an LI field value greater than or equal to three. Furthermore, only an LSSU 38 (FIG. 4) will have an LI field value equal to either one or two. Finally, only an FISU 40 (FIG. 5) will have an LI field value equal to zero. As will be described in more detail herein, the value of the length indicator field is advantageously used by the present invention in the determination of the load being carried by the common channel signalling link.

Because only MSUs 36 have LI field values greater than or equal to three, this means that at least three bytes of signalling (i.e., message) data are included between the LI field 54 and CK field 56. These three bytes include not only the processor signalling message 59 itself, but also the bytes provided in a Service Indicator (SI) field 58 and a Signalling Information Field (SIF) 60. The SI field 58 carries information about the priority of the MSU 36. The SIF 60 contains signalling information. Fill-in bytes 57 may also be present, but are not counted in determining the LI field 54 value.

The LSSU 38 has an LI field value equal to either one or two, meaning that either one or two bytes of signalling (i.e., message) data are included between the LI field 54 and CK field 56. These one or two bytes include not only the processor signalling message 59 itself, if any is present, but also the byte provided in a Status information (SF) field 62. The SF field 62 carries information relating to the status of the communications link 28. Fill-in bytes 57 may also be present, but are not counted in determining the LI field 54 value.

Finally, the FISU 40 has an LI field value equal to zero, meaning that zero bytes of processor signalling (i.e., message) data are included between the LI field 54 and CK field 56. Fill-in bytes 57 may be present, but are not counted in determining the LI field 54 value. The FISU is only used on the communications link 28 when no MSUs 36 or LSSUs 38 are being transmitted.

Figure 2:
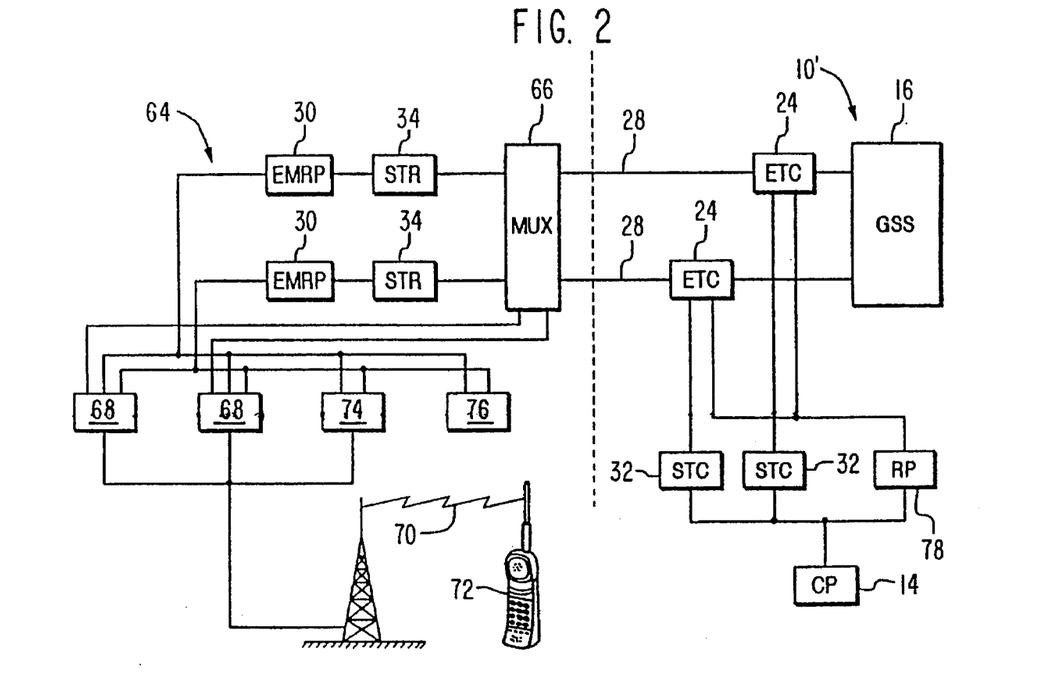
FIG. 2 is a block diagram of a portion of a mobile telephone network utilizing a common channel signalling system.

Referring now to FIG. 2, wherein like or similar elements in the telephone network are designated with the same reference numeral as in FIG. 1, there is shown a block diagram of a portion of a mobile telephone network including an exchange 10' and a remote base station 64. The exchange 10' includes a central processor 14, a group switching subsystem 16, exchange terminal circuits 24 and signalling terminals (central) 32 interconnected in the same manner as provided in the parent exchange 10 of FIG. 1.

In the remote base station 64, the communications links 28 with the exchange 10' are connected to a multiplexer 66. The multiplexer 66 performs a similar function to the exchange terminal board 26 in the remote subscriber switch 12 of FIG. 1. The processor signalling messages carried on the channels (e.g., channel sixteen) in each communications link 28 for the common channel signalling system are connected to a signalling terminal (regional) 34 which is further connected to the extension module regional processor 30.

The subscriber communications carried on the channels of the communications link 28, on the other hand, are connected from the multiplexer 66 to a plurality of voice channel circuits 68 for facilitating subscriber communications over a wireless communications link 70 using mobile telephones 72. The extension module regional processor 30 is also connected to the voice channel circuits 68, and is further connected to a control channel circuit 74 for facilitating the use of well known control message communications over the link 70 between the base station 64 and the mobile telephones 72. A signal strength circuit 76, also connected to the extension module regional processor 30, is provided for monitoring the signal strength of the communications effectuated over the link 70 between the base station 64 and the mobile telephones 72.

In the mobile telephone network of FIG. 2, the processor signalling messages are formatted and reformatted for transmission over, and inserted into and extracted from the communications link 28 in the same manner as provided for and described above with respect to the common channel signalling system for the telephone network of FIG. 1. As previously described, these processor signalling messages are formatted into signal units (MSUs 36, LSSUs 38 and FISUs 40) in accordance with the CCITT CCS # 7 protocol.

The capacity of the networks of FIGS. 1 and 2 for handling subscriber communications is related to the capacity of the channel of the communications link 28 reserved for carrying processor signalling messages in a common channel signalling system. Attention to common channel signalling system capacity issues has become even more important of late as the capabilities of, and the services provided by telephone network exchanges have dramatically increased. If the reserved channel on the communications link 28 carrying processor signalling messages on a common channel signalling system becomes overloaded, it becomes increasingly more difficult for the system to handle voice communications and for the subscriber to make efficient and effective use of any exchange provided services and, in particular, value added services. Accordingly, it is vitally important that the processor signalling message load on the communications link 28 be closely monitored in a graceful, proactive manner, rather than on a reactive manner as has historically been the case.

Reference is now again made to FIGS. 1 and 2 described above, and additionally to FIG. 6 wherein there is shown a flow diagram illustrating the processing method of the present invention. Through use of the central processor 14 of the exchanges 10 or 10', or preferably any other regional processor 78 included therein, the exchange monitors processor signalling message traffic over the communications link 28 (step 80 of FIG. 6) on the common channel signalling system. In particular, the regional processor monitors the LI field 54 of each signal unit (MSU 36, LSSU 38 or FISU 40) transmitted over the communications link 28 during a predetermined time period to identify the LI field values providing the number of 8-bit bytes of useful message traffic (i.e., the relevant bytes included in the signal unit between the LI field and the CK field 56) in each signal unit (step 82 of FIG. 6). In the preferred embodiment, the predetermined time period is selected to be one second. The determination of the number of relevant 8-bit bytes transmitted over the reserved channel is made by summing the monitored LI field 54 values for the signal units transmitted over the link 28 during the one second time period (step 84 of FIG. 6).

Figure 6:
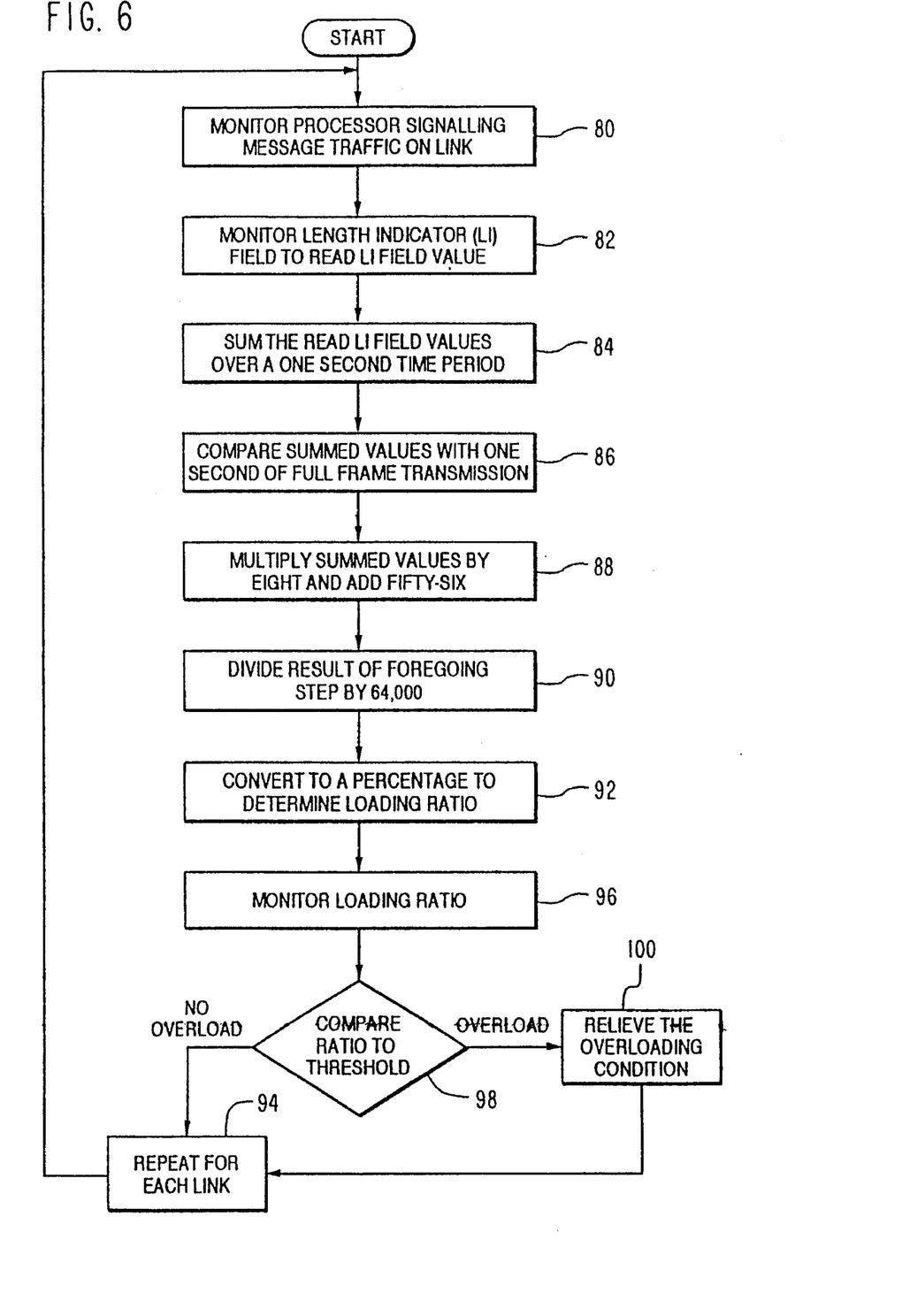
FIG. 6 is a flow diagram showing the processing method of the present invention.

The number of bytes identified in step 82 is next compared to the number of full frame CCITT CCS # 7 protocol bytes that could be transmitted over the communications link 28 (step 86 of FIG. 6). In particular, the summed LI field 54 values for the time period are multiplied by eight and added to fifty-six to determine the total number of bits of relevant message data transmitted over the communications link 28 during the time period (step 88 of FIG. 6). To identify the load on the communications link 28 caused by the transmission of processor signalling messages, the ratio of the number of bits found in step 88 to the maximum number of CCITT CCS # 7 protocol bits transmittable in one second is taken (step 90 of FIG. 6). For a 64 kbps facility, 64,000 bits of full frame CCITT CCS # 7 protocol data is the maximum number of bits that could be transmitted in a one second time period. This ratio figure can be converted to a loading ratio percentage by multiplying by one hundred (step 92 of FIG. 6). The equation for calculating the loading ratio in percent is given by the following:

$$\text{LOADING RATIO}(\%) = \frac{\sum_{i=1}^{m}(LI \times 8) + 56}{64,000} \times 100$$

wherein m is the total number of signal units transmitted in one second, and LI is the LI field 54 value of the MSUs 36, LSSUs 38 and FISUs 40 transmitted over the communications link. It will be noted that for transmitted FISUs 40, the LI field 54 value is zero and therefore does not contribute to the total number of transmitted bits of relevant message data. The load calculation is repeated for the common channel signalling systems provided on each communications link 28 (step 94 of FIG. 6).

The regional processors 78 of the exchanges 10 and 10' monitor the communications link 28 through the provided signalling terminals (central) 32 and/or the exchange terminal circuits 24 and, in response to the determined loading ratio, control operation of and access to the communications links 28 provided between the exchange and the included regional equipment such as the remote subscriber switch 12 or remote base station 64 (step 96 of FIG. 6). The determined loading ratio is compared to a predetermined threshold level which may be adjusted (step 98 of FIG. 6) to gracefully and proactively detect the existence of an overloading condition, in response to which the processors 14 or 78 of the exchanges 10 or 10' will operate to relieve the overloading condition (step 100 of FIG. 6) by, for example, spreading the processor signalling messages across more of the included communications links 28 in the network, and thus increase the number of messages per second that the network is currently handling. The processors 14 or 78 alternatively may respond to an overloading condition by discarding low priority messages or controlling the flow of signalling terminal traffic.

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A telephone system, comprising:

an exchange including a central processor;

a piece of regional equipment including at least one regional processor;

a communications link connecting the exchange to the piece of regional equipment, the communications link comprising multiple channels, at least one of said channels being a signalling channel carrying common channel signalling messages between the central processor of the exchange and the at least one regional processor in the regional equipment, wherein the common channel signalling messages are formatted into signal units and each signal unit includes a length indicator field containing a value indicative of the number of bytes of message data carried thereby;

means in the exchange for reading the length indicator field of each signal unit for the common channel signalling messages carried on each signalling channel to extract the message data byte value for use in determining communications link load and detecting an overloading of the communications link; and means in the exchange responsive to the detected overloading of the communications link for relieving the overloading.

2. The telephone system as in claim 1 wherein the means for relieving comprises means for spreading the common channel signalling messages to other communications links.

3. The telephone system as in claim 1 wherein the means for relieving comprises means for discarding certain common channel signalling messages as being of a low priority.

4. The telephone system as in claim 1 wherein the means for relieving comprises means for controlling the flow of common channel signalling messages.

5. The telephone system as in claim 1 wherein the means for reading comprises:

means for identifying from the length indicator field an amount of message data being transmitted;

means for summing the identified amount of message data transmitted over the communications link during a predetermined time period;

means for determining a loading ratio for the common channel signalling communications transmitted over each signalling channel by taking the ratio of the summed amount of message data to an amount of full frame data transmittable during an equivalent time period; and means for comparing the determined loading ratio to an adjustable threshold value to detect the overloading of the communications link.

6. In a telephone system utilizing common channel signalling to handle signal unit messages transmitted over a signalling channel of a communications link between a first and a second processor, wherein each signal unit includes a length indicator field containing a value indicative of the number of bytes of message data carried by the signal unit message, a method for communications link load determination comprising the steps of:

reading the length indicator field for each signal unit to extract the message data byte value for use in determining an amount of message data in each signal unit transmitted over the signalling channel;

summing the determined amounts of message data to identify a total amount of message data transmitted over the signalling channel during a predetermined time period;

comparing the summed total amount of message data with an amount of full frame data transmittable during an equivalent time period to obtain a loading ratio for the communications link;

comparing the loading ratio with a threshold loading value to determine the existence of an overload condition; and relieving overload on the communications link following determination of the existence of the overload condition.

7. The method as in claim 6 wherein the step of relieving includes one or more of the following steps of spreading signal unit messages to other communications links, discarding low priority signal unit messages or controlling flow of signal unit messages.

8. The method as in claim 6 wherein the step of summing comprises the step of adding together the read length indicator field values.

9. A common channel signalling system, comprising:

a communications link having multiple channels, at least one channel being a signalling channel carrying signalling messages in the form of signal units, each signal unit including a length indicator field containing a value indicative of the number of bytes of message data carried by the signal unit;

means at each end of the communications link for inserting the signal units into and extracting the signal units from the signalling channel of the communications link; and means for monitoring the load on the communications link, comprising:

means for reading the length indicator field of each signal to extract message data byte values for use in determining a total amount of message data carried by the signal units over the signalling channel of the communications link during a predetermined time period; and means for comparing the determined total amount with an amount of full frame data transmittable over the signalling channel of the communications link during an equivalent time period to identify a loading ratio for the communications link.

10. The common channel signalling system as in claim 9 further including means responsive to increases in the identified loading ratio for identifying a danger of overload on the communications link.

11. The common channel signalling system as in claim 10 further including means responsive to dangerous increases in the identified loading ratio for relieving loading increases.

12. The common channel signalling system as in claim 11 wherein the means for relieving comprises one of the following:

means for spreading the signalling message transmissions to other communications links in response to the overload;

means for discarding certain signalling message transmissions as being of a low priority; or means for controlling flow of messages through the means for inserting and extracting.

13. The common channel signalling system as in claim 9 further including means responsive to the identified loading ratio for identifying an overload on the communications link and in response thereto relieving the overload.

14. The common channel signalling system as in claim 13 wherein the means for identifying and relieving comprises means for spreading the signalling message transmissions to other communications links in response to the overload.

15. The common channel signalling system as in claim 13 wherein the means for identifying and relieving comprises means for discarding certain signalling message transmissions as being of a low priority.

16. The common channel signalling system as in claim 13 wherein the means for identifying and relieving comprises means for controlling flow of messages through the means for inserting and extracting.

17. The common channel signalling system as in claim 9 wherein the means for reading comprises:

means for summing the values read during the predetermined time period to determine the total amount of message data carried over the communications link.

18. The common channel signalling system as in claim 9 wherein the means for comparing comprises means for taking the ratio of the determined total amount of message data to the amount of full frame data.

19. In a common channel signalling system including a communications link having multiple channels, at least one channel being a signalling channel carrying signalling messages in the form of signal units, each signal unit including a length indicator field containing a value indicative of the number of bytes of message data carried by the signal unit, a method for monitoring the load on the communications link comprising the steps of:

reading the length indicator field of each signal unit to extract message data byte values for use in determining a total amount of message data carried by signal units over the signalling channel of the communications link during a predetermined time period; and comparing the determined total amount with an amount of full frame data transmittable over the signalling channel of the communications link during an equivalent time period to identify a loading ratio for the communications link.

20. The method as in claim 19 further including the steps of:

identifying an overload on the communications link from the loading ratio; and in response thereto either:

spreading the signalling message transmissions to other communications links in the response to the overload;

discarding low priority signalling message transmissions; or controlling the flow of signalling messages over the communications link.

21. The method as in claim 19 wherein the step of reading comprises the step of:

summing the values read during the predetermined time period to determine the total amount of message data carried over the communications link.

22. The method as in claim 19 wherein the step of comparing comprises the step of taking the ratio of the determined total amount of message data to the amount of full frame data.

23. The method as in claim 19 further including the step of identifying from the loading ratio increases in the load on the communications link indicative of a danger of overload.

24. The method as in claim 23 further including the steps of responding to dangerous increases by either:

spreading the signalling message transmissions to other communications links in the response to the overload;

discarding low priority signalling message transmissions; or controlling the flow of signalling messages over the communications link.

25. A telephone system, comprising:

an exchange including a central processor;

a piece of regional equipment including at least one regional processor;

a communications link connecting the exchange to the piece of regional equipment, the communications link comprising multiple channels, at least one of said channels being a signalling channel carrying common channel signalling messages between the central processor of the exchange and the at least one regional processor in the regional equipment, wherein the common channel signalling messages are formatted into signal units and each signal unit includes a length indicator field containing a value indicative of the number of bytes of message data carried thereby;

means in the exchange for reading the length indicator field of each signal unit for the common channel signalling messages carried on each signalling channel to extract the message data byte values for use in determining communication link load and measuring real-time loading of the communications link; and means in the exchange responsive to an increase in the measured real-time loading of the communications link indicative of a danger of overload for relieving the increasing loading.

26. The telephone system as in claim 25 wherein the means for relieving comprises one or more of the following:

means for spreading the common channel signalling messages to other communications links;

means for discarding certain common channel signalling messages as being of a low priority; or means for controlling flow of common channel signalling messages.

27. The telephone system as in claim 25 wherein the means for reading comprises:

means for identifying from the length indicator field an amount of message data being transmitted;

means for summing the dentified amount of message data transmitted over the communications link during a predetermined time period;

means for determining a loading ratio for the common channel signalling communications transmitted over each signalling channel by taking the ratio of the summed amount of message data to an amount of full frame data transmittable during an equivalent time period; and means for processing the determined loading ratio to detect the increasing loading of the communications link.

28. In a telephone system utilizing common channel signalling to handle signal unit messages transmitted over a signalling channel of a multi-channel communications link between a first and a second processor, wherein each signal unit includes a length indicator field containing a value indicative of the number of bytes of message data carried by the signal unit message, a method for communications link load determination comprising the steps of:

reading the length indicator field of each signal unit to extract the message data byte value for use in determining an amount of message data in each signal unit transmitted over the signalling channel;

summing the monitored amount of message data to identify a total amount of message data transmitted over the signalling channel during a predetermined time period;

comparing the summed total amount of message data with an amount of full frame data transmittable during an equivalent time period to obtain a loading ratio for the communications link;

processing the loading ratio to identify increases in loading indicative of a danger of an overload; and relieving load on the communications link following indication of the danger of an overload.

29. The method as in claim 28 wherein the step of summing comprises the step of adding together the read length indicator field values.

30. The method as in claim 28 wherein the step of relieving includes one or more of the following steps of:

spreading signal unit messages to other communications links;

discarding low priority signal unit messages; or controlling flow of signal unit messages.

31. In a telephone system utilizing common channel signalling to handle signal unit messages transmitted over a signalling channel of a multi-channel communications link between a first and a second processor, wherein each signal unit includes a length indicator field containing a value indicative of the number of bytes of message data carried by the signal unit message, a method for communications link load determination comprising the steps of:

reading the length indicator field of each signal unit to extract the message data byte values for use in determining an amount of message data in each signal unit transmitted over the signalling channel; and processing the amount of message data determined from the read length indicator field values to determine a loading of the communications link.

32. The method as in claim 31 wherein the step of processing comprises the steps of:

summing the monitored amount of message data to identify a total amount of message data transmitted over the signalling channel during a predetermined time period;

comparing the summed total amount of message data with an amount of full frame data transmittable during an equivalent time period to obtain a loading ratio for the communications link;

processing the loading ratio to determine the loading of the communications link.

33. A common channel signalling system, comprising:

a communications link having multiple channels, at least one channel being a signalling channel carrying signalling messages in the form of signal units, each signal unit including a length indicator field containing a value indicative of the number of bytes of message data carried by the signal unit;

means at each end of the communications link for inserting the signal units into and extracting the signal units from the signalling channel of the communications link; and means for monitoring the load on the communications link, comprising:

means for reading the length indicator field of each signal unit to extract the message data byte values for use in determining an amount of message data carried by signal units over the signalling channel of the communications link; and means for processing the determined amount of message data to determine a loading of the communications link.

34. The common channel signalling system as in claim 33 wherein the means for processing comprises:

means for comparing the determined amount of message data with an amount of full frame data to identify a loading ratio for the communications link; and means for identifying an overload of the communications link from the loading ratio.

* * * * *

UNITED STATES PATENT AND TRADEMARK OFFICE
CERTIFICATE OF CORRECTION

PATENT NO. : 5,615,255
DATED : Mar. 25, 1997
INVENTOR(S) : Lemieux

It is certified that error appears in the above-identified patent and that said Letters Patent is hereby corrected as shown below:

Column 11, line 34  Replace "dentified"
With --identified--

Signed and Sealed this

Third Day of February, 1998

BRUCE LEHMAN

*Attest:*

*Attesting Officer*  Commissioner of Patents and Trademarks